(12) United States Patent
Zhang et al.

(10) Patent No.: US 11,128,185 B2
(45) Date of Patent: Sep. 21, 2021

(54) ELECTRIC MACHINE, METHOD OF MANUFACTURING THE ELECTRIC MACHINE, ROTOR AND ADJUSTMENT DEVICE

(71) Applicant: BROSE FAHRZEUGTEILE GMBH & CO KOMMANDITGESELLSCHAFT, WUERZBURG, Wuerzburg (DE)

(72) Inventors: Sunny Zhang, Eindhoven (NL); Maurad Berkouk, Le Conquet (FR); Thomas Susemihl, Wuerzburg (DE); Daniel Fiederling, Wertheim (DE)

(73) Assignee: Brose Fahrzeugteile GmbH & Co. Kommanditgesellschaft, Wuerzburg, Wuerzburg (DE)

( * ) Notice: Subject to any disclaimer, the term of this patent is extended or adjusted under 35 U.S.C. 154(b) by 1095 days.

(21) Appl. No.: 15/389,636

(22) Filed: Dec. 23, 2016

(65) Prior Publication Data
US 2017/0187256 A1 Jun. 29, 2017

(30) Foreign Application Priority Data
Dec. 23, 2015 (EP) ..................................... 15202604

(51) Int. Cl.
*H02K 1/27* (2006.01)
*H01F 7/02* (2006.01)
(Continued)

(52) U.S. Cl.
CPC ............ *H02K 1/272* (2013.01); *B60K 17/12* (2013.01); *B62D 5/04* (2013.01); *H01F 7/0221* (2013.01);
(Continued)

(58) Field of Classification Search
CPC ........ H02K 1/272; H02K 1/2766; H02K 1/02; H02K 15/03; H02K 21/16; H02K 7/14; B60K 17/12; B62D 5/04; H01F 7/0221
See application file for complete search history.

(56) References Cited

U.S. PATENT DOCUMENTS

| 2002/0070620 A1* | 6/2002 | Naito | ................... H02K 1/2766 |
| | | | 310/156.56 |
| 2009/0189470 A1* | 7/2009 | McClellan | ............. H02K 53/00 |
| | | | 310/154.29 |

(Continued)

FOREIGN PATENT DOCUMENTS

| CN | 101960539 A | 1/2011 |
| CN | 103457372 A | 12/2013 |

(Continued)

*Primary Examiner* — Jue Zhang
(74) *Attorney, Agent, or Firm* — Laurence A. Greenberg; Werner H. Stemer; Ralph E. Locher (57) ABSTRACT

An electric machine of a motor vehicle, in particular of an adjustment drive or of a radiator fan, has a rotor which is mounted so as to be rotatable about a machine axis. The rotor has a number of permanent magnets which are arranged in the radial direction. Each permanent magnet has one side with a strong magnetic flux and one side with a weak magnetic flux in the tangential direction. When the permanent magnets are adjacent in the tangential direction, different sides are directed towards one another.

16 Claims, 6 Drawing Sheets

(51) Int. Cl.
*B60K 17/12* (2006.01)
*B62D 5/04* (2006.01)
*H02K 1/02* (2006.01)
*H02K 7/14* (2006.01)
*H02K 15/03* (2006.01)
*H02K 21/14* (2006.01)

(52) U.S. Cl.
CPC ............. *H02K 1/02* (2013.01); *H02K 1/2766* (2013.01); *H02K 7/14* (2013.01); *H02K 15/03* (2013.01); *H02K 21/14* (2013.01)

(56) References Cited

U.S. PATENT DOCUMENTS

| | | | |
|---|---|---|---|
| 2013/0320796 | A1 | 12/2013 | Vyas et al. |
| 2014/0111052 | A1* | 4/2014 | Wu ...................... H02K 1/2773 310/156.28 |
| 2015/0001970 | A1* | 1/2015 | Zhang .................... H02K 1/276 310/43 |
| 2016/0126792 | A1* | 5/2016 | Yamaguchi .......... H02K 1/2766 310/43 |
| 2016/0254714 | A1* | 9/2016 | Hashizume .......... H02K 1/2773 310/90 |

FOREIGN PATENT DOCUMENTS

| | | | |
|---|---|---|---|
| JP | H10271722 | A | 10/1998 |
| JP | 2011135638 | A | 7/2011 |
| JP | 2015070721 | A | 4/2015 |

\* cited by examiner

ELECTRIC MACHINE, METHOD OF MANUFACTURING THE ELECTRIC MACHINE, ROTOR AND ADJUSTMENT DEVICE

CROSS-REFERENCE TO RELATED APPLICATION

This application claims the priority, under 35 U.S.C. § 119, of European patent application EP 15 202 604.3, filed Dec. 23, 2015; the prior application is herewith incorporated by reference in its entirety.

BACKGROUND OF THE INVENTION

Field of the Invention

The invention relates to an electric machine of a motor vehicle. An electric machine is understood to be a generator, but, in particular, an electric motor. The electric machine is preferably a component of an adjustment drive such as a gearbox actuator or of a radiator fan. The invention also relates to a method for manufacturing an electric machine and to an adjustment drive of a motor vehicle as well as to a rotor of an electric machine.

In at least partially automated gearboxes of a motor vehicle, the individual shift stages (gears) are set by a gearbox actuator. For this, the gearbox actuator has a so-called shift finger and an electric motor, wherein the shift finger can be adjusted by the electric motor. The individual shift stages are selected by the shift finger, for which reason the position of the shift finger determines the desired transmission ratio.

A brushless electric motor whose stator is energized by electronics is usually used as the electric motor. The electronics contain a number of semiconductor components which are connected in a bridge circuit. The bridge circuit is conventionally a B6 circuit, and the stator has multi-phase windings, in particular three phase field windings which are connected to one another either in a delta connection or star connection.

The electric motor furthermore has a permanently excited rotor. In other words, a number of permanent magnets, which interact with the magnetic field generated by the stator, are mounted on the rotor. In this context, the permanent magnets are located in pockets in a rotor body, wherein a laminated core, whose individual laminations are arranged perpendicularly with respect to the axis of the rotor, is usually employed as the rotor body. The laminations bear one against the other via an electrically insulating coating layer, in order to prevent parasitic eddy currents from propagating in the rotor body, whose currents would otherwise limit the efficiency of the electric motor.

In order to be able to apply a comparatively large torque to the electric motor, it is necessary for the permanent magnets to have a comparatively large magnetic flux. For this purpose, permanent magnets are usually employed which have a comparatively high level of magnetic moment. This is usually implemented by permanent magnets which contain rare earth elements that increase manufacturing costs. Owing to the sintering process, the magnetic flux of the permanent magnets is also not constant, for which reason the torque which is applied by means of the electric motor has a ripple.

SUMMARY OF THE INVENTION

The invention is based on the object of specifying a particularly suitable electric machine of a motor vehicle, a particularly suitable rotor of an electric machine, a particularly suitable method for manufacturing an electric machine and a particularly suitable adjustment drive of a motor vehicle, wherein, in particular, a torque ripple is reduced and/or a torque which can be applied is increased.

The electric machine has a rotor which is mounted so as to be rotatable about a machine axis. The rotor is preferably located inside a stator. In other words, the electric machine is an internal rotor. The stator suitably contains at least one electric coil which is energized by electronics when the electric machine is used as an electric motor, and the electric motor is embodied, in particular, in a brushless form. The stator preferably contains three field windings, wherein each of the field windings contains at least one electric coil. The field windings are placed in electric contact with one another in, for example, a delta connection or star connection. In contrast, when the electric machine is used as a generator, a voltage is tapped at the coil/the field windings. An electric machine is consequently understood to be, in particular, a brushless electric motor (DC motor) or a synchronous machine, but also a generator.

The rotor has a number of permanent magnets which are arranged in the radial direction. Consequently, the permanent magnets are distributed essentially in a star shape around the machine axis, and the cross section of each permanent magnet has, perpendicularly with respect to the machine axis, an end (free end) which is located in the region of the machine axis, as well as a further end which is at an enlarged distance from the machine axis. Each of the permanent magnets has one side with a strong magnetic flux and one side with a weak magnetic flux in the tangential direction. The magnetic flux of the side with the strong magnetic flux is larger than the magnetic flux of the side with the weak magnetic flux. In other words, the strong magnetic flux and weak magnetic flux relate, in particular, merely to the comparison of the magnetic flux of the two sides, wherein the magnetic flux of the side with the strong magnetic flux is larger than the magnetic flux of the side with the weak magnetic flux. In particular, the respective side is determined on the basis of the manufacture of the respective permanent magnet. For example, the side with the weak magnetic flux has a reduced magnetic flux density and/or a reduced magnetic voltage and/or an enlarged magnetic resistance, in particular in comparison with the side with the strong magnetic flux.

When permanent magnets are adjacent in the tangential direction, different sides are directed towards one another. In other words, permanent magnets which are adjacent in the tangential direction point with their respective side with the weak magnetic flux in opposing tangential directions. In summary, the side with the strong or weak magnetic flux has respectively adjacent permanent magnets in different tangential directions. Therefore, in each case one side with a strong magnetic flux and in each case one side with a weak magnetic flux of the permanent magnets which are respectively adjacent in the tangential direction are assigned to one another, and vice versa. Adjacent is understood here to mean, in particular, the respective directly adjacent permanent magnet. In other words, there is no further permanent magnet between two adjacent permanent magnets.

The electric machine preferably has an even number of permanent magnets. In particular, the electric machine has between 6 and 20, 8 and 14 and preferably 10 such permanent magnets. The angle which is formed between adjacent permanent magnets and whose apex is located on the machine axis, is expediently always of the same size and preferably equal to 360° divided by the number of permanent magnets. The rotor suitably has merely permanent magnets with one side with a strong magnetic flux in the tangential direction, and with one side with a weak magnetic flux in the tangential direction wherein all the permanent magnets are arranged in such a way that when permanent magnets are adjacent in the tangential direction, different sides are directed towards one another. Consequently, the side with the strong magnetic flux compensates the reduced magnetic flux of the side of the weak magnetic flux of the respective adjacent permanent magnet, and vice versa, for which reason an essentially constant magnetic flux is present between respectively adjacent permanent magnets. As a result, the magnetic field of the rotor is essentially rotationally symmetrical with respect to the machine axis, for which reason a torque ripple when the rotor rotates about the machine axis is reduced.

The electric machine is a component of a motor vehicle and, in particular, of a secondary assembly of the motor vehicle. In other words, the electric machine does not serve to drive the motor vehicle itself. For example, the electric machine is a component of a radiator fan, of a window lifter or of an electric seat adjustment device. The electric machine is particularly preferably used as a component of a power steering system, as what is referred to as a steering motor, or as a component of a gearbox actuator by which shift stages of a gearbox are selected in an automated fashion during operation.

Each of the permanent magnets is preferably in one piece, which, on the one hand, reduces manufacturing costs of the permanent magnets. On the other hand, mounting on further components of the rotor is simplified. Alternatively, or in combination with this, each of the permanent magnets is sintered, that is to say in particular produced from a powdery material. For this, the ferrite powder is preferably used, which is particularly preferably free of rare earth elements. Consequently each of the permanent magnets further reduces manufacturing costs.

Each of the permanent magnets is magnetized in the tangential direction. Consequently, a magnetic pole, that is to say a north pole or a south pole, which points in the radial direction and which interacts during operation with the magnetic field produced by the stator, if one is present, is located in the tangential direction between respectively adjacent permanent magnets. Owing to the positioning of the permanent magnets, each of the north poles and each of the south poles is respectively assigned to one side with a strong magnetic flux and one side with a weak magnetic flux, for which reason the strength of each magnetic pole is essentially the same with the result that a torque ripple is reduced.

For example, the cross section of the permanent magnets is rectangular perpendicularly with respect to the machine axis, wherein two of the edges of each cross section are arranged in parallel and axially symmetrical in relation to a respective radial straight line. In other words, the permanent magnets are distributed in a star shape around the machine axis. Each permanent magnet preferably has a C-shaped cross section which is formed perpendicularly with respect to the machine axis. The cross section therefore has a convex boundary line or the concave boundary line. The two free ends of each of the cross sections is located here, in particular, on a radial straight line, that is to say on a straight line which intersects the machine axis. Each permanent magnet itself is at least partially spaced apart from this radial straight line or at least curved away therefrom owing to the C-shaped cross section, wherein the concave boundary curve is at a smaller distance from the radial straight line, in particular in the region of the curvature. Owing to the C-shaped cross section, each of the permanent magnets has an increased volume in comparison with a rectangular cross section, for which reason, even when comparatively cost-effective materials, which have, for example, a reduced level of magnetic moment, are used, the rotor has a comparatively large magnetic flux, which increases the efficiency of the electric machine.

All the permanent magnets are preferably curved in the same tangential direction. In other words, the two free ends of each of the permanent magnets point in the same tangential direction, and the curvature which is made available by the C-shaped cross section is always located on the same side of the respective radial straight line in the tangential direction. Consequently, the arrangement of the cross sections of all the permanent magnets is essentially turbine-like. The permanent magnets are preferably arranged in a rotationally symmetrical fashion with respect to the machine axis. In this context, the rotational angle is preferably equal to the angle between two adjacent permanent magnets, wherein the apex is located on the machine axis. The arrangement with respect to the magnetic flux is expediently not taken into account in this consideration of symmetry. In other words, the positioning of all the permanent magnets with respect to the magnetic flux is interchanged in a rotationally symmetrical mapping with respect to only the single multiple of the angle formed between two adjacent permanent magnets. In other words, one side with a strong magnetic flux is mapped onto one side with a weak magnetic flux, and vice versa.

The C-shaped cross section of each of the permanent magnets is, for example, formed essentially by means of three rectangles which are offset at a specific angle with respect to one another, wherein one of the rectangles is connected on a free side with, in each case, one of the two further rectangles. As an alternative to this, at least one of the boundary curves is formed by an arc, for example the convex boundary line or the concave boundary line. However, the cross section particularly preferably has a convex boundary curve and a concave boundary curve, which are both respective arcs or segments of a circle. The centre point of the two arcs is preferably located on an auxiliary straight line which is perpendicular with respect to the radial straight line on which the two free ends of the C-shaped cross section are located. The auxiliary straight line is suitably arranged centrally between the two free ends in a radial direction. As a result, an essentially symmetrical cross section of the permanent magnets is made available, which simplifies the manufacture, storage and mounting thereof. Formation of an unbalance is also prevented and/or it is not necessary to make available a wide variety of shapes for the manufacture of the permanent magnets. When mounting the permanent magnets it is also essentially unnecessary to pay attention to a preferred direction, with the exception of the sides with the weak and respectively strong magnetic flux.

For example, the radius of the arc which forms the concave boundary curve is equal to the radius of the arc which forms the convex boundary curve. In this context the centre points of the two arcs are shifted with respect to one another, wherein they are located, in particular, on the auxiliary straight line. Alternatively or in combination therewith, the arc which forms the concave boundary curve has a larger radius than the arc which forms the convex boundary curve. In particular, the two boundary curves intersect at the two free ends or merge with a blunt, rounded tip. In one alternative to this, each permanent magnet is bounded in the radial direction with a tangential or curved boundary edge.

For example, the concave boundary curve is formed with an arc whose radius extends towards infinity. In other words, the cross section of the permanent magnet is essentially D-shaped. However, the radius is preferably finite and preferably smaller than the extent of the permanent magnet in the radial direction. In this context, the radius of the arc which forms the concave boundary curve is particularly preferably also smaller than the extent of the permanent magnet in the radial direction. The radius of the arc which forms the concave boundary curve is suitably larger than the radius of the arc which forms the convex boundary curve, and the centre point of the arc which forms the convex boundary curve is offset from the centre point of the arc which forms the concave boundary curve, in the direction of the concave boundary curve. Owing to the enlarged convex boundary curve, the magnetic flux density of each permanent magnet, and consequently also the torque of the electric machine, are increased.

The rotor preferably contains a laminated core which is formed from individual laminations stacked one on top of the other in the axial direction. The axial direction is parallel to the machine axis. The individual laminations are connected, for example, by bonding or punch-packing to form the laminated core. The laminations are produced from a soft iron and provided with an electrical insulation layer, which prevents the formation of eddy currents. In particular, the rotor comprises a shaft to which the laminated core is connected, wherein the shaft is parallel to the axial direction and concentric with respect to the machine axis. The laminated core has a number of recesses which is equal to the number of permanent magnets. In each case, one of the permanent magnets is arranged inside each of the recesses. In particular, at least partially a positively locking engagement and/or frictionally locking engagement is formed between the laminated core and the permanent magnets.

For example, each recess is open on the outside in the radial direction to form a slot which runs in the axial direction. In this context, each of the recesses is preferably bounded in the radial direction by a projection, by which the tangential orientation of the slot is reduced. In other words, each recess has the projection which is directed in the tangential direction and against which the respective permanent magnet bears. This essentially excludes the possibility of the permanent magnet becoming detached from the laminated core. In addition, on the one hand compensation of tolerances is made possible. On the other hand, concentrating the magnetic flux which is produced by the respective permanent magnet is ensured by the individual projections. Each of the recesses preferably has two such projections which are, in particular, directed towards one another. In other words, the two projections secure the permanent magnet in the radial direction and the recess consequently engages around the permanent magnet essentially in an L-shape. Consequently, the two projections form a means of rear engagement for the permanent magnet, for which reason detachment from the laminated core is prevented. For example, each of the permanent magnets bears against the respectively assigned projection, at least in a partially frictionally locking and/or positively locking fashion.

Alternatively or in combination therewith, the laminated core contains a number of holders which corresponds, in particular, to the number of permanent magnets. The holders are arranged in the tangential direction between the individual permanent magnets, for which reason adjacent permanent magnets are spaced apart from one another in the tangential direction by the holders. For example, the permanent magnets bear against the respective holders in an at least partially frictionally locking and/or positively locking fashion. The holders themselves are connected to a securing star whose center point is located on the machine axis. One of the holders is connected, in particular integrally molded on, to each of the tips of the central securing star. An opening is preferably present between adjacent tips of the securing star, which essentially excludes the possibility of the formation of magnetic fields which are directed away from the stator.

The laminated core preferably has a number of axial recesses which are arranged in the tangential direction between adjacent permanent magnets. In particular, each of the holders has one of the axial recesses if these are present. The axial recesses have, for example, a round, oval or triangular cross section. In particular, the cross section is an equilateral triangle. For example, one tip of the triangle points towards the machine axis, and the triangle is preferably arranged axis-symmetrically with respect to a radial straight line. The axial recesses make it possible for the magnetic fields which are produced by the permanent magnets to be directed away from the machine axis, in particular towards the stator, which improves the efficiency of the electric machine.

The method for manufacturing an electric machine which has a rotor which is mounted so as to be rotatable about a machine axis and has a number of permanent magnets which are arranged in the radial direction, wherein each permanent magnet has one side with a strong magnetic flux and one side with a weak magnetic flux in the tangential direction, wherein when permanent magnets are adjacent in the tangential direction, different sides are directed towards one another, provides that in a first working step a first permanent magnet is determined which has one side with a strong magnetic flux and one side with a weak magnetic flux in the tangential direction. In a further working step, which can take place simultaneously or chronologically independently thereon, a second permanent magnet is determined which has one side with a strong magnetic flux and one side with a weak magnetic flux in the tangential direction.

In a subsequent working step, the two permanent magnets are arranged adjacent to one another in the tangential direction in such a way that different sides are directed towards one another. In other words, either the side with the strong magnetic flux of the first permanent magnet is directed towards the side with the weak magnetic flux of a second permanent magnet, or the side with the weak magnetic flux in the first permanent magnet is directed towards the side of the strong magnetic flux of the second permanent magnet. In particular, in all the permanent magnets of the electric machine, the respective side with the strong magnetic flux and that with the weak magnetic flux are determined and all the magnets are arranged in such a way that when permanent magnets are adjacent in the tangential direction, different sides are directed towards one another. In particular, the invention relates to an electric machine which is manufactured according to this method. The electric machine is preferably produced in a process in which the method is carried out repeatedly, in particular between 2 and 10 times, wherein all of the electric machines which are produced by the process have the same arrangement as the permanent magnets with respect to the sides with the strong and weak magnetic flux, respectively.

The electric machine of a motor vehicle has a rotor which is mounted so as to be rotatable about a machine axis. The electric machine is expediently a component of a motor vehicle and, in particular, of a secondary assembly of the motor vehicle. In particular, the electric machine is a generator or particularly preferably an electric motor. The electric machine is preferably a component of an adjustment drive of the motor vehicle such as, for example, a radiator fan, an electric seat adjustment device or a power steering system. In other words, the electric motor is a steering motor. However, the electric motor is particularly preferably a component of a gearbox actuator. The rotor has a number of permanent magnets which are arranged in the radial direction. Each of the permanent magnets has a C-shaped cross section perpendicularly with respect to the machine axis, wherein two free ends are formed which are located on a radial straight line. Between the two free ends, an auxiliary straight line intersects the radial straight line at a 90° angle and is consequently perpendicular with respect thereto. The center points of the arcs, which form, on the one hand, the convex boundary curve and, on the other hand, the concave boundary curve, of the C-shaped cross section of the respective permanent magnet are located on this auxiliary straight line.

In particular, the auxiliary straight line is arranged centrally between the two free ends. The concave boundary curve has here a smaller maximum distance from the radial straight line than the convex boundary curve. The radius of the arc which forms the concave boundary curve is larger than the radius of the arc which forms the convex boundary curve. In this way, on the one hand a comparatively high degree of stability of the permanent magnet and, on the other hand, a comparatively high level of efficiency of the electric machine are implemented. All the permanent magnets are particularly preferably curved in the same tangential direction. In other words, in the tangential direction the permanent magnets are located essentially on the same side in relation to the respective radial straight line. The electric machine preferably only has permanent magnets of this type, with the effect that the cross section of the structure formed by the permanent magnets is configured essentially in a turbine-like fashion perpendicularly with respect to the machine axis.

The rotor of the electric machine has a number of permanent magnets which are arranged in the radial direction. The permanent magnets have one side with a strong magnetic flux and one side with a weak magnetic flux in the tangential direction, and are arranged in such a way that when permanent magnets are adjacent in the tangential direction, different sides are directed towards one another. Alternatively or in combination therewith, each of the permanent magnets has a C-shaped cross section perpendicularly with respect to the machine axis. The cross section has a concave boundary curve and a convex boundary curve which are both arcs whose centre point is in each case located on an auxiliary straight line which is perpendicular with respect to a radial straight line on which the free ends of the respective cross section are arranged. The arc which forms the concave boundary curve has a larger radius than the arc which forms the convex boundary curve.

The adjustment drive of a motor vehicle has an electric machine with such a rotor. In particular, the adjustment drive is an electric window lifter, an electric sunroof or an electric seat adjustment device. As an alternative to this, the adjustment drive is a radiator fan. The adjustment drive particularly preferably has a gearbox actuator by means of which an automatic or semi-automatic gearbox of the motor vehicle is actuated. In this context, the gearbox actuator either activates a clutch and/or drives a shaft finger by means of which a shift stage of the gearbox is selected.

Other features which are considered as characteristic for the invention are set forth in the appended claims.

Although the invention is illustrated and described herein as embodied in an electric machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIGS. 3 to 4B are section views of further embodiments of the electric motor.

FIGS. 6 to 8*c* are section view each showing further embodiments of the permanent magnet;

DETAILED DESCRIPTION OF THE INVENTION

Parts which correspond to one another are provided with the same reference symbols in all the figures.

Figure 1:
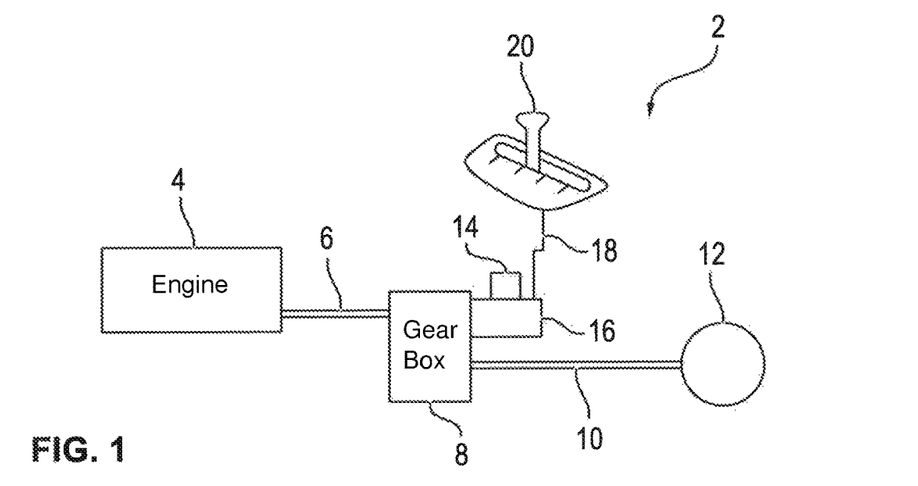
FIG. 1 is a diagrammatic illustration of a drive train of a motor vehicle with a gearbox actuator having an electric motor according to the invention.

Referring now to the figures of the drawings in detail and first, particularly to FIG. 1 thereof, there is shown a schematic illustration of a drive train 2 of a motor vehicle. An internal combustion engine 4 is operatively connected to driven wheels 12 via a first shaft 6, a gearbox 8, a second shaft 10 and a non-illustrated differential. In this context, the rotational movement of the first shaft 6, driven directly by the internal combustion engine 4, is converted into a rotational movement of the driven wheels 12, wherein both the direction of rotation and the rotational speeds of the two differ. Owing to the differential, the rotational movement occurs essentially at a right angle to the rotational movement of the second shaft 10.

A specific transmission ratio between the first shaft 6 and the second shaft 10 is determined by the gearbox 8. In addition, the direction of rotation of the second shaft 10 is set by the gearbox 8. For this, the gearbox 8 has a number of what are referred to as shift stages which are selected by a gearbox actuator 16 which contains an electric motor 14. The electric motor 14 drives, for this purpose, an adjustment part of the gearbox actuator 16, which is in turn operatively connected to a selection mechanism of the gearbox 8. The gearbox actuator 16 also has non-illustrated controller electronics which control the electric motor 14 and which are set by a selector lever 20 via a data line 18. The data line 18 is a CAN bus, and the driver can select the direction of movement of the motor vehicle by the selector lever 20.

Figure 2:
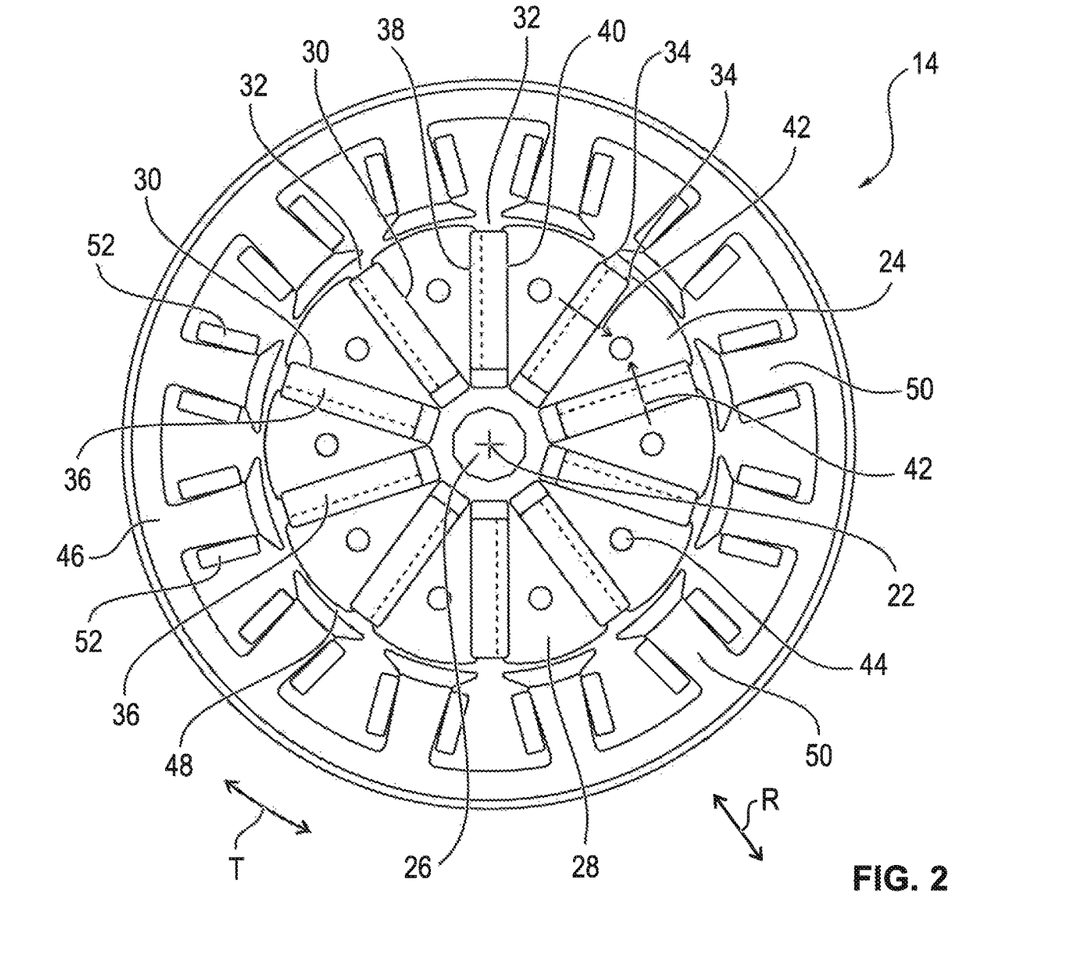
FIG. 2 is a sectional view of a first embodiment of the electric motor.

FIG. 2 illustrates the electric motor 14 perpendicularly with respect to a machine axis 22 in a sectional illustration. The electric motor 14 has a rotor 24 which is mounted so as to be rotatable about the machine axis 22 and contains a machine shaft 26 centrally. The adjustment part of the gearbox actuator 16 is connected to the machine shaft 26, and the machine shaft 26 is mounted so as to be rotatable by bearings, for example ball bearings (not illustrated in more detail). A laminated core 28 is connected in a rotationally fixed fashion to the machine shaft 26 and has a number of individual laminations which are stacked one on top of the other in the axial direction A, that is to say parallel to the machine axis 22. The laminated core 28 has 10 recesses 30 which run in a rotationally symmetric fashion with respect to the machine axis 22 and radially and which are opened radially on the outside by a slot 32 in each case. Each of the slots 32 is bounded by two projections 34, directed towards one another, of the laminated core 28.

An essentially cuboid-shaped permanent magnet 36 is arranged inside each of the recesses 30, the permanent magnets 36 therefore also being arranged in the radial direction R and surrounding the machine axis 22 essentially in a star shape. The permanent magnets 36 are produced in one piece from a ferrite powder by sintering. Owing to this method of manufacture, each of the permanent magnets 36 has one side with a strong magnetic flux 38 and one side with a weak magnetic flux 40. These two sides 38, 40 bound the respective permanent magnet 36 in the tangential direction T. When permanent magnets 36 are respectively adjacent in the tangential direction T, in each case different sides 38, 40 are directed towards one another. Consequently, all the sides with a strong magnetic flux 38 point in a single tangential direction T. In the variant illustrated, all the sides with the strong magnetic flux 38 point in the anticlockwise direction, while all the sides with a weak magnetic flux 40 point in the clockwise direction, in relation to the respective permanent magnet 36 in each case.

Each of the permanent magnets 36 has a magnetization direction 42 which is directed in the tangential direction T with respect to each of the permanent magnets 36. In this case, permanent magnets 36 which are respectively adjacent in the tangential direction T are magnetized in opposing directions, with the result that in each case the two north poles or the two south poles are directed towards one another. As a result, a radially outwardly directed magnetic pole is formed between permanent magnets 36 which are respectively adjacent in the tangential direction T. In this context, each of the magnet poles is assigned both one side of a strong magnetic flux 38 and one side of a weak magnetic flux 40, for which reason the magnetic flux of each of the magnetic poles is essentially of equal magnitude. This results in reduced torque ripple during the operation of the electric motor 14.

The laminated core 28 has in each case an axial recess 44 between respectively adjacent recesses 30, said axial recess 44 having, for example, a round cross section (illustrated here). The magnetic field which is produced by the permanent magnets 36 is suitably shaped by the axial recess 44 which runs parallel to the machine axis 22.

The rotor 24 is surrounded in the radial direction R by a stator 46 to form an air gap 48. The stator 46 has a number of teeth 50, in this case 12 teeth 50, which run in the axial direction A, that is to say parallel to the machine axis 22. Each of the teeth 50 is wound with an electric coil 52, by means of which a magnetic field which rotates about the machine axis 22 is made available during operation. The magnetic field interacts with the magnetic field made available by the permanent magnets 36, which moves the rotor 24 in a rotational movement about the machine axis 22.

Figure 3:
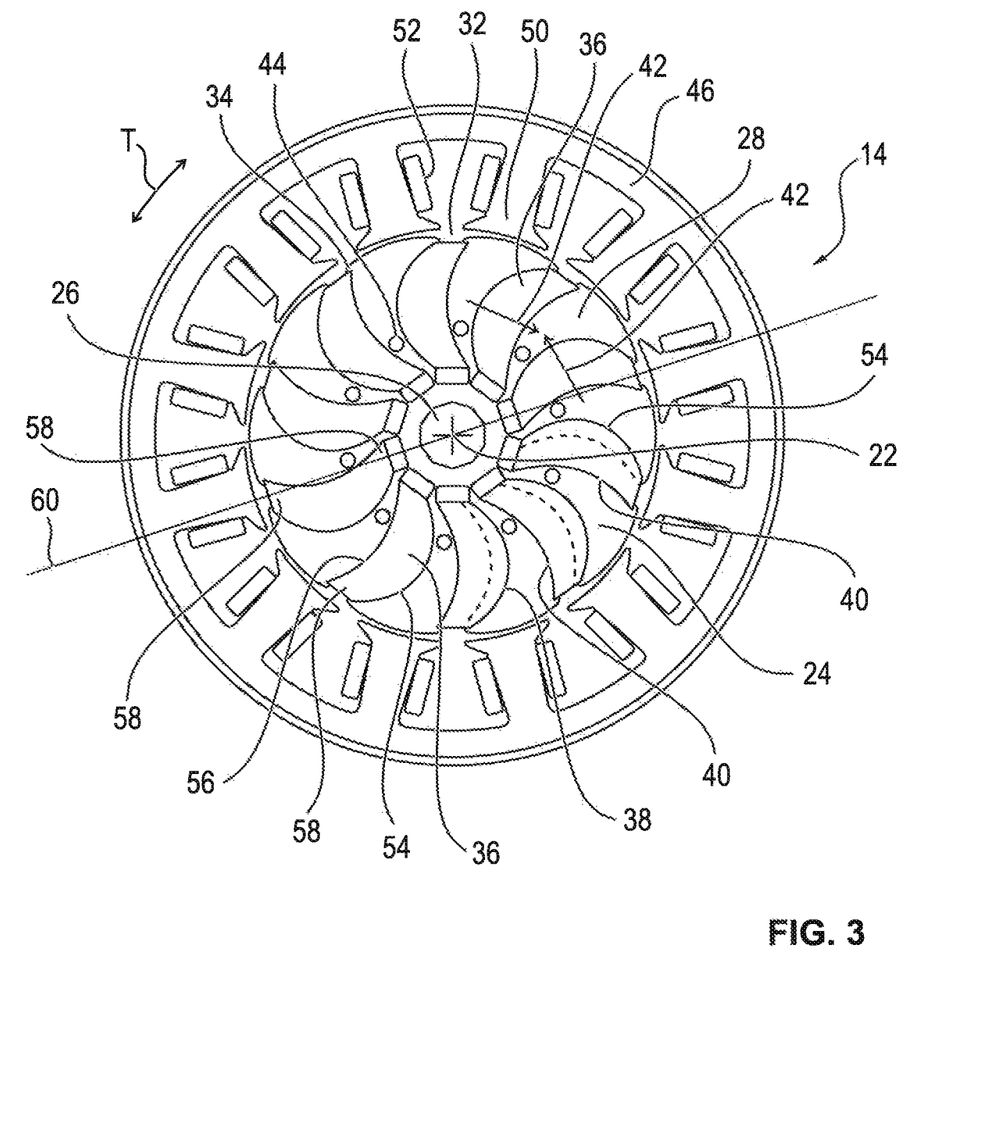

FIG. 3 illustrates a further embodiment of the electric motor 14, wherein the stator 46 with its teeth 50 and electric coils 52 has been left unchanged. In contrast, the rotor 24 is modified, and has, in turn, the machine shaft 26 and the laminated core 28, which is, however, modified. In this context, the axial recesses 44 are offset inwards in the radial direction R and have an essentially oval cross section. In addition, the recesses 30 and the permanent magnets 36 are changed and are in turn positioned inside the recesses 30. In this context, each of the recesses 30 is again assigned in each case to one of the permanent magnets 36. In the example illustrated here, the recesses 30 also each have, on the outside in the radial direction R, the slot 32 which is bounded by the two projections 34, said slots 32 being directed towards one another. In addition, the magnetization direction 42 of each of the permanent magnets 36 also runs in the tangential direction T, wherein in each case identical magnetic poles are directed towards one another when permanent magnets 36 are adjacent in the tangential direction T.

However, in contrast to this, each of the permanent magnets 36 has an essentially C-shaped cross section perpendicularly with respect to the machine axis 22. Consequently, each of the permanent magnets 36 has a convex boundary curve 54 and a concave boundary curve 56 which run between the two free ends 58 of the permanent magnet 36. The two free ends 58 of each of the permanent magnets 36 are located in each case on an assigned radial straight line 60. The convex boundary curves 54 bound the respective permanent magnet 36 in the same tangential direction T in each case, and also the concave boundary curves 54. All the concave boundary curves 56 in the illustrated example point in the clockwise direction, while the convex boundary curves 54 point counter to the clockwise direction. Consequently, all the permanent magnets 36 are distributed around the machine axis 22 essentially in a turbine-like fashion and are curved in the same tangential direction T. In the illustrated example, the side with the strong magnetic flux 38 is located on the convex boundary curve 54, while the concave boundary curve 56 is formed by the side with the weak magnetic flux 40.

Figure 4A:
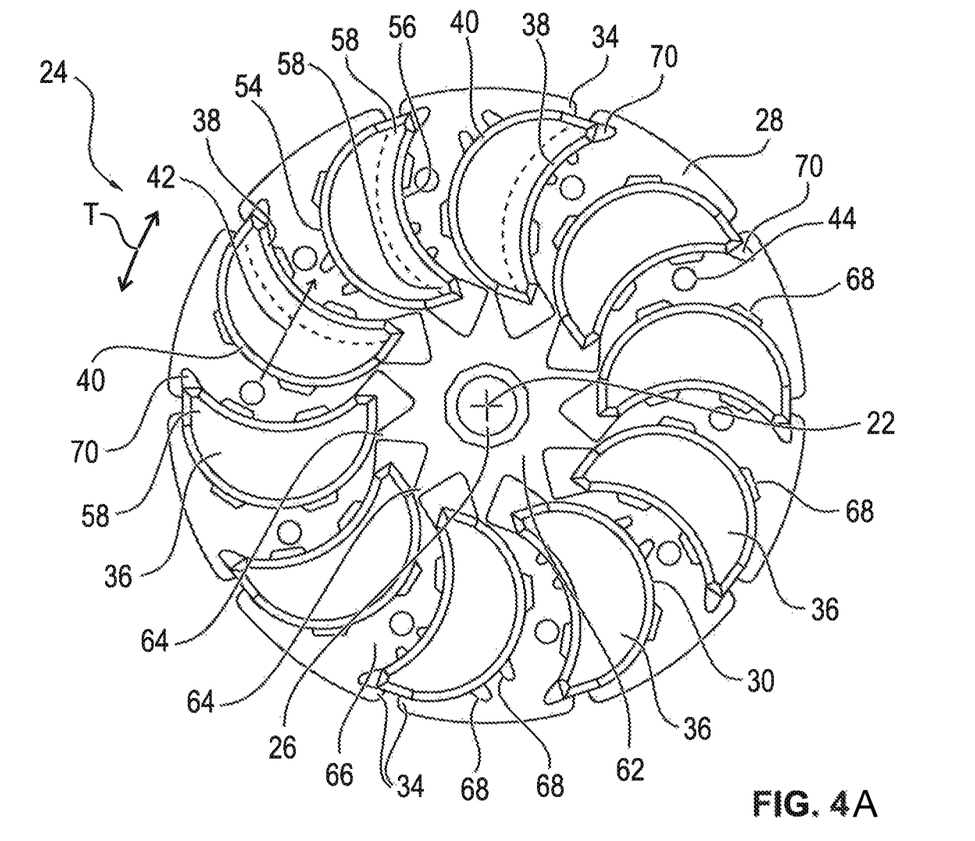

FIG. 4A illustrates a further embodiment of the rotor 24 according to FIG. 3. The permanent magnets 36 and the shaft 26 are essentially left unchanged. However, in contrast to the previous embodiment, here, for example, the side with the strong magnetic flux 38 and that with the weak magnetic flux 40 are interchanged. As a result, the convex boundary curve 54 is formed by the side with the weak magnetic flux 40, and the concave boundary curve 56 is formed by the side with the strong magnetic flux 38. In contrast, the magnetization direction 42 is left the same, as is the radial arrangement of the permanent magnets 36, whose free ends 58 are each located on a radial straight line 60 and have an essentially C-shaped cross section. In contrast, the laminated core 28 is modified, wherein the axial recesses 44 have an essentially round cross section and are offset further towards the outside in the radial direction R compared to the previous embodiment.

The laminated core 28 has a central securing star 62 which surrounds the shaft 26. The central securing star 62 has 10 tips 64 and is configured rotationally symmetrical with respect to the machine axis 22. The holder 66 is integrally formed onto each of the tips 64, wherein each of the tips 64 is respectively assigned to one of the holders 66. The holders 66 are arranged between respectively adjacent permanent magnets 36 in the tangential direction T, with the result that the recesses 30 are formed by the holders 66. In this context, the holders 66 also have the projections 34. However, in comparison with the preceding embodiment, the concave boundary curve 56 and the convex boundary curve 54 of the permanent magnets 36 do not bear over their full surface on the laminated core 28 in the form of the holders 66. Instead, the recesses 30 have groove-shaped depressions 68, wherein, for example, three different types of depressions 68 are formed here.

Three adjacent recesses 30 and the recesses 30 which are arranged in a point-symmetrical fashion with respect to the machine axis 22 each have four groove-shaped depressions 68, wherein in each case two are assigned to the holder 66 of the respective recess 30. In the case of the recesses 30 which are located intermediately in the tangential direction T, in each case two depressions 68 which lie opposite in the tangential direction T are replaced by two depressions 68 which, however, have a smaller radial extent. Here, on the one hand, the radially inner depressions 68 and, on the other hand, the two outer depressions 68 are replaced by the two depressions 68. In addition, in the case of the radially outer free end 58 of the permanent magnets 36, the concave boundary curve 56 is not completely surrounded by the laminated core. Instead, a recess 70 is formed between the holder 66 and the permanent magnet, the recess 70 being enclosed by the projection 34 which is arranged on the side.

Figure 4B:
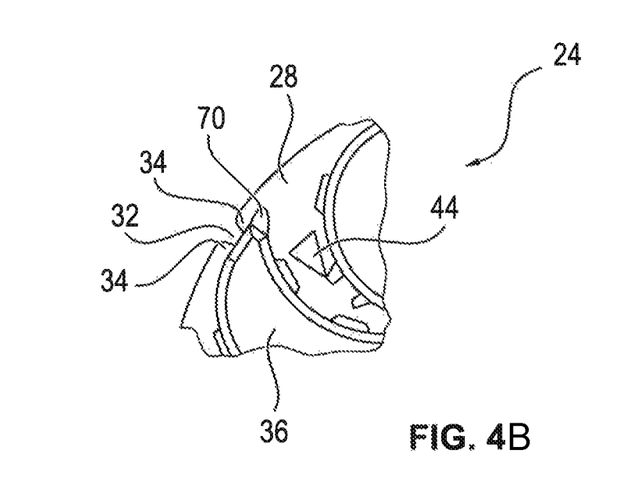

FIG. 4B illustrates the recess 70 once more in more detail and shows a portion of a further embodiment of the rotor 24. In this context, essentially only the axial recess 44, which has a triangular cross section, is changed. The triangle is equilateral, and the tip points radially inwards towards the machine axis 22.

Figure 5:
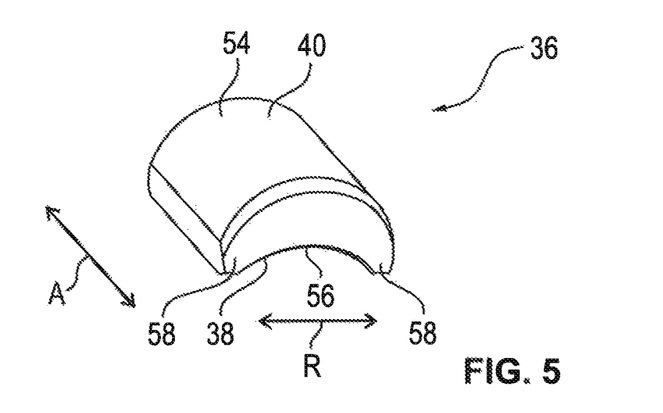
FIG. 5 is a perspective view of a permanent magnet of the electric motor.

FIG. 5 is a perspective view of one of the permanent magnets 36, which is produced from the sintered ferrite powder. The cross section perpendicularly with respect to the axial direction A is C-shaped, wherein the convex boundary curve 54 and the concave boundary curve 56 are located between the two free ends 58. One of these two curves is formed by the side with the weak magnetic flux 40, and the remaining curve is formed by the side with the strong magnetic flux 38. In the example illustrated, the convex boundary curve 54 is made available by the side with the weak magnetic flux 40.

Owing to the C-shaped cross section, the magnetic field which is made available by the permanent magnet 36 is enlarged, since the magnetic field is essentially dependent on the surface of the permanent magnet 36 and is essentially proportional with respect thereto. Since their convex boundary surface 54 is formed by an arc between the two free ends 58, the magnetic field which is made available by the permanent magnet 36 is enlarged in comparison with the variant illustrated in FIG. 2 in which the two free ends 58 of each permanent magnet 36 are connected by a straight curve.

Figure 6:
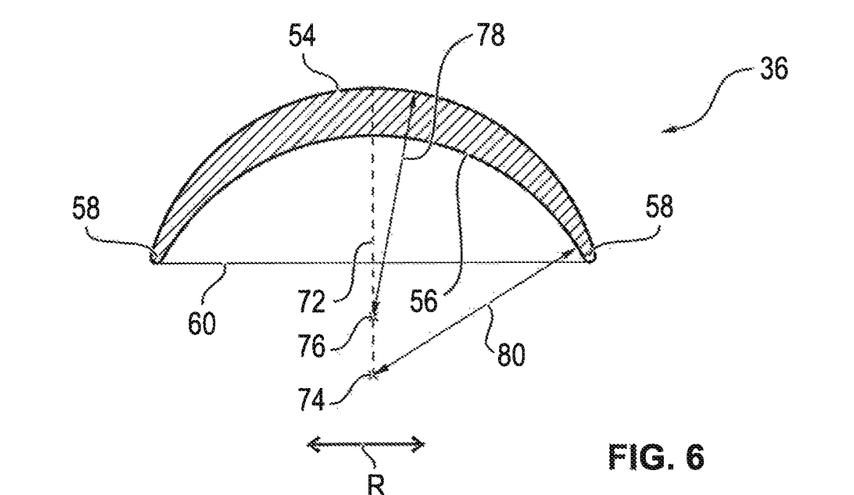

FIG. 6 illustrates a further embodiment of the permanent magnet 36, wherein each of the free ends 58 is formed by an acute angle, and not by means of a stepped surface as in the preceding example. The two free ends 58 are located on the radial straight line 60 which is intersected perpendicularly by an auxiliary straight line 72, in the central position between the two free ends 58. A center point 74 of an arc by which the concave boundary curve 56 is formed, and a centre point 76 of an arc by means of which the convex boundary curve 54 is formed, are located on the auxiliary straight line 72. In other words, all the points of the convex boundary curve 54 have the same distance from the center point 76, specifically a first radius 78. Likewise all the points of the concave boundary curve 56 have the same distance from the center point 74, specifically a secondary radius 80.

The two radii 78, 80 are each for example of equal magnitude or, as in the variant illustrated here, the second radius 80 is larger than the first radius 78. In other words, the arc which forms the concave boundary curve 56 has the larger second radius 80, and the arc which forms the convex boundary curve 54 has the smaller first radius 78. In the case of the previously illustrated permanent magnets 36, the two boundary curves 54, 56 are also preferably made available by an arc.

Figure 7A:
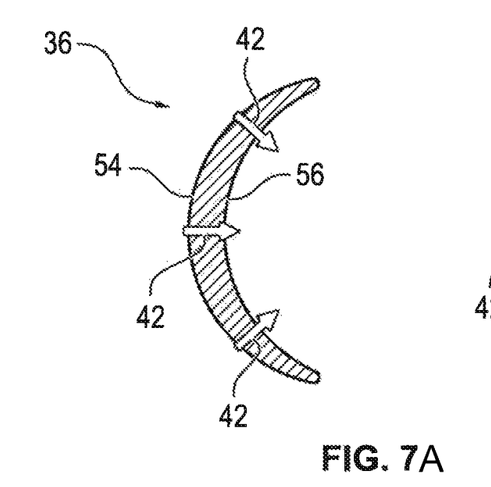
Figure 7B:
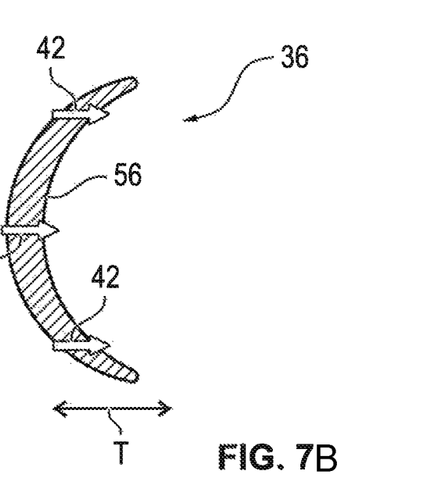

FIGS. 7A and 7B illustrates the cross section through the permanent magnet 36 once more. Here, the magnetization direction 42 is shown. In the case of the embodiment illustrated in FIG. 7B, this magnetization direction 42 is directed in the tangential direction T. In contrast, in the variant shown in FIG. 7A the magnetization direction 42 is directed perpendicularly either with respect to the concave boundary curve 56 or with respect to the convex boundary curve 54, that is to say consequently essentially towards the respectively assigned centre point 74, 76.

Figure 8A:
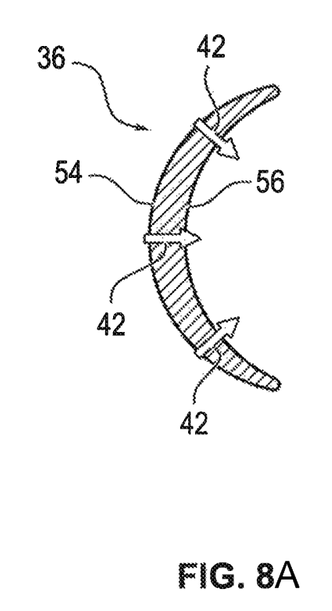
Figure 8B:
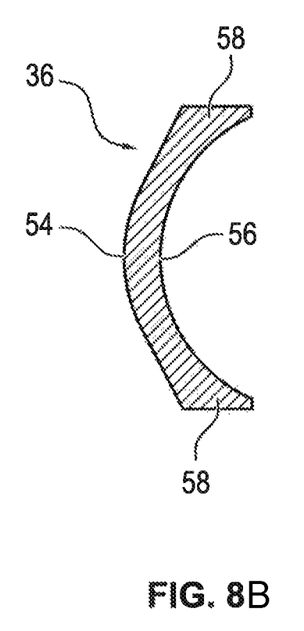
Figure 8C:
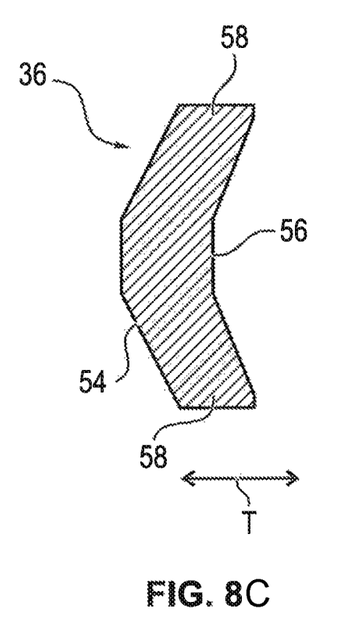

FIG. 8A shows once more the permanent magnet 36 which is illustrated in FIG. 7A and which is modified in FIGS. 8B, 8C. In this context, in FIG. 8B the convex boundary curve 54, which is formed by means of an arc in FIG. 8A, is replaced at least partially by a trapezoidal shape. As a result, the free ends 58 are configured in a thickened fashion. In the embodiment illustrated in FIG. 8C, the concave boundary curve 56 is also configured in an essentially trapezoidal shape. In other words, the arc is replaced by means of a curve which is formed by means of three sections. In the variants illustrated in FIGS. 8B, 8C, the magnetization direction 42 is not illustrated and is either in the tangential direction T or perpendicular in relation to the respective boundary face 54, 56.

Figure 9:
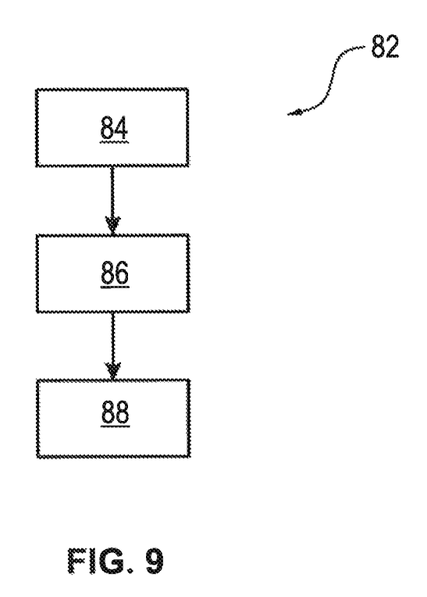
FIG. 9 is a flow chart showing a method for manufacturing the electric motor.

FIG. 9 illustrates a method 82 for manufacturing the electric motor 14. In a first working step 84, one of the permanent magnets 36, which has the side with the strong magnetic flux 38 and the side with the weak magnetic flux 40 in the tangential direction T, is determined. In a second working step 86, a further of the permanent magnets 36 is determined which also has the side with the strong magnetic flux 38 and the side with the weak magnetic flux 40 in the tangential direction T. In a subsequent third working step 88, the two permanent magnets 36 are arranged inside the laminated core 28 in such a way that the side with the weak magnetic flux 40 of one of the two permanent magnets 36 points towards the side with the strong magnetic flux 38 of the remaining permanent magnet 36. In particular, these two sides 38, 40 bear against the same holder 66 and surround it, if the electric motor 40 (illustrated in FIG. 3) is produced.

Figure 10:
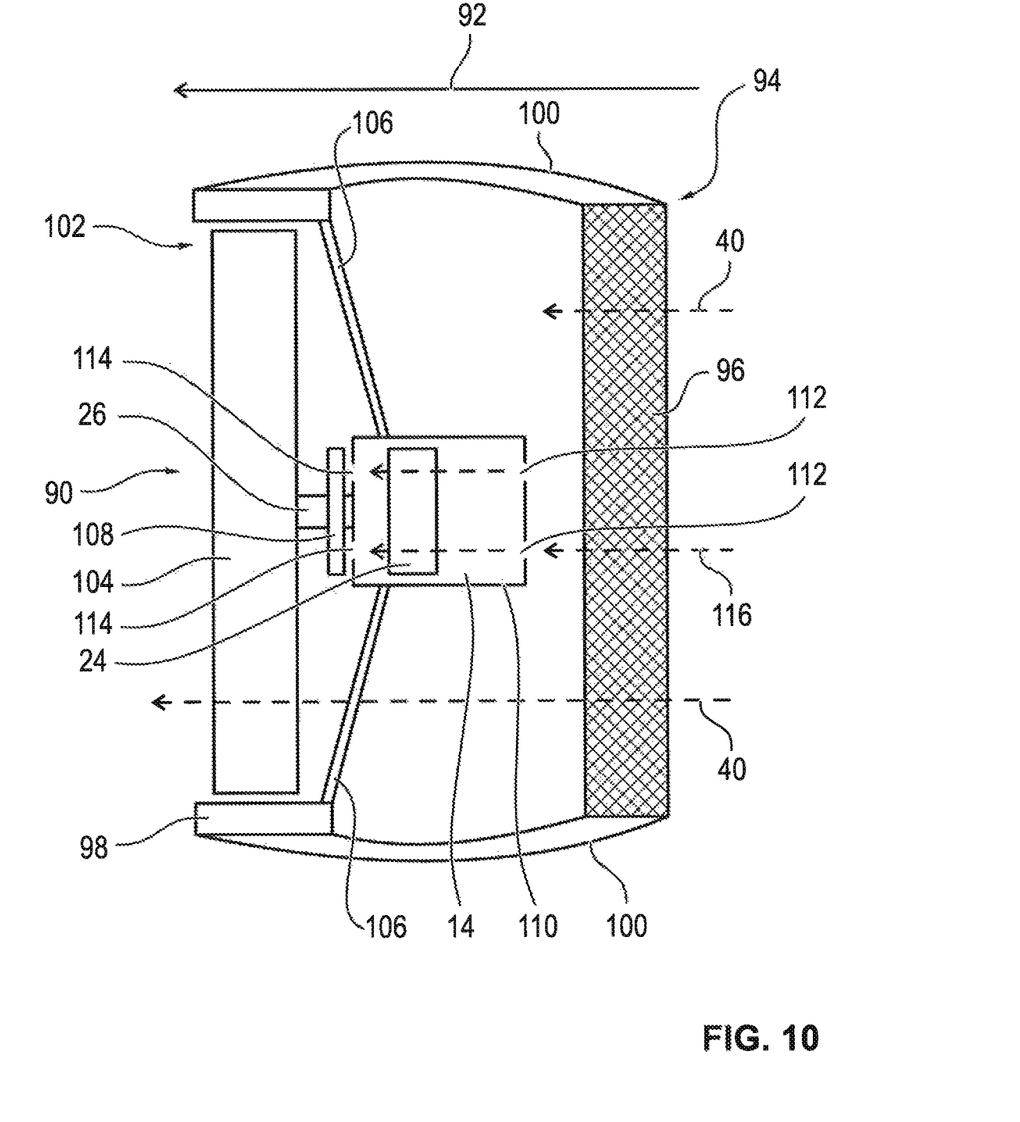
FIG. 10 is an illustration showing a further embodiment of the adjustment drive as a radiator fan in a schematically simplified form.

FIG. 10 shows a further embodiment of the adjustment drive in the form of a radiator fan 90 of the motor vehicle in a schematic sectional illustration in a relative wind direction 92. The relative wind direction 92 is directed parallel to a travel direction of the motor vehicle 2 and counter thereto. The relative wind direction 92 denotes, in particular, the direction of a relative wind which impinges on the motor vehicle 2 during its satisfactory operation. The motor vehicle 2 comprises a radiator crossrail 94 with a radiator block 96, on which a fan shroud 98 is mounted. The attachment is carried out by separate webs 100. In other words, the illustrated fan shroud 98 is not connected to the radiator block 96 in an airtight fashion. However, airtight mounting of the radiator crossrail 94 on the radiator block 96 would be conceivable.

An impeller wheel 104 of the radiator fan 90 is arranged in a recess 102 in the fan shroud 98 and is essentially parallel to the radiator block 96. The junction between the impeller wheel 104 and the fan shroud 98 can be implemented by means of specific contours or brushes (not shown here) in order to avoid what is referred to as leakage air. The impeller wheel 104 is driven by means of the machine shaft 26 of the electric motor 14. The electric motor 14, which is a component of the radiator fan 90, is in turn attached to the fan shroud 98 by means of struts 106 and is positioned between the impeller wheel 104 and the radiator block 96. The rotor 24 of the electric motor 14 corresponds to one of the embodiments shown above.

A number of fan blades 108 are operatively connected to the shaft 18, with their radial extent being small compared to the impeller wheel 104 and being equal to the radial extent of a housing 110 of the electric motor 14. The housing 110 is essentially cylindrical, wherein the cylinder axis is parallel to the relative wind direction 92. A number of inlet openings 112 and outlet openings 114 are formed in the housing 110, in each case in the base face or cover face of the cylinder-like housing 110 within which the rotor 24 and the stator 46 of the electric motor 14 are arranged.

By rotating the impeller wheel 104, a relative wind 116 is amplified, or generated when the motor vehicle 2 is stationary, the relative wind 116 being parallel to the relative wind direction 2 and being directed in the same direction as the latter. The relative wind 116 is therefore sucked through the radiator block 96 by means of the radiator fan 90. The relative wind 116 impinges at least partially on one of the cover faces of the cylinder-like housing 110. This portion enters the housing 110 via the inlet openings 112 and is sucked again out of the housing 110 through the outlet openings 114 by the fan blades 108 which have the same direction of rotation as the impeller wheel 104. The air flow within the housing 110 therefore runs essentially parallel to the relative wind direction 2 and to the relative wind 116 which is directed around the housing 110.

The invention is not restricted to the exemplary embodiments described above. Instead, other variants of the invention can also be derived herefrom by a person skilled in the art without departing from the subject matter of the invention. In particular, in addition, all the individual features which are described in relation to the individual exemplary embodiments can also be combined with one another in some other way, without departing from the scope of the invention.

The following is a summary list of reference numerals and the corresponding structure used in the above description of the invention:

2 Drive train
4 Internal combustion engine
6 First shaft
8 Gearbox
10 Second shaft
12 Driven wheel
14 Electric motor
16 Gearbox actuator
18 Data line
20 Selector lever
22 Machine axis
24 Rotor
26 Machine shaft
28 Laminated core
30 Recess
32 Slot
34 Projection
36 Permanent magnet
38 Side of the strong magnetic flux
40 Side of the weak magnetic flux
42 Magnetization direction
44 Axial recess
46 Stator
48 Air gap
50 Tooth
52 Electric coil
54 Convex boundary curve
56 Concave boundary curve
58 Free end
60 Radial straight line
62 Central securing star
64 Tip
66 Holder
68 Depression
70 Recess
72 Auxiliary straight line
74 Centre point of the concave boundary curve
76 Centre point of the convex boundary curve
78 First radius
80 Second radius
82 Method
84 First working step
86 Second working step
88 Third working step
90 Radiator fan
92 Relative wind direction
94 Radiator crossrail
96 Radiator block
98 Fan shroud
100 Web
102 Recess
104 Impeller wheel
106 Strut
108 Fan blade
110 Housing
112 Inlet opening
114 Outlet opening
116 Relative wind
A Axial direction
R Radial direction
T Tangential direction

The invention claimed is:

1. An electric machine for a motor vehicle, the electric machine comprising:
a stator having an electrical coil;
a rotor mounted so as to be rotatable about a machine axis and having a number of permanent magnets disposed in a radial direction, each of said permanent magnets having a first side with a strong magnetic flux and a second side with a weak magnetic flux in a tangential direction, wherein when said permanent magnets are adjacent in the tangential direction, said first and second sides are directed towards one another, and said permanent magnets are magnetized in the tangential direction.

2. The electric machine according to claim 1, wherein each of said permanent magnets is at least one of sintered or in one piece.

3. The electric machine according to claim 2, wherein said permanent magnets are sintered from a ferrite powder.

4. The electric machine according to claim 1, wherein each of said permanent magnets has a C-shaped cross section perpendicularly with respect to the machine axis, each of said permanent magnets having a free end disposed on a radial straight line.

5. The electric machine according to claim 4, wherein all of said permanent magnets are curved in the tangential direction.

6. The electric machine according to claim 4, wherein said C-shaped cross section has a concave boundary curve and a convex boundary curve which are both arcs whose center points are each disposed on an auxiliary straight line which is perpendicular to the radial straight line, wherein the auxiliary straight line is disposed in the radial direction.

7. The electric machine according to claim 6, wherein an arc which forms said concave boundary curve has a larger radius than an arc which forms said convex boundary curve.

8. The electric machine according to claim 6, wherein said C-shaped cross section has two free ends and the auxiliary straight line is disposed in the radial direction centrally between said two free ends.

9. The electric machine according to claim 1, wherein said rotor has a laminated core with a number of recesses formed therein corresponding to a number of said permanent magnets, wherein one of said permanent magnets is disposed inside one of said recesses in each case.

10. The electric machine according to claim 9, wherein said rotor has projections, each of said recesses is bounded on an outside in the radial direction by means of said projections.

11. The electric machine according to claim 10, wherein each of said recesses is bounded on the outside in the radial direction by means of two of said projections which are directed towards one another.

12. The electric machine according to claim 9, wherein:
said rotor has a central securing star with tips; and
said laminated core has holders which are disposed in the tangential direction between said permanent magnets and are each connected to one of said tips of said central securing star.

13. The electric machine according to claim 9, wherein said rotor has axial recesses formed therein, said axial recesses are disposed in the tangential direction between respectively adjacent said permanent magnets.

14. A method for manufacturing an electric machine, which comprises the steps of:
providing a stator having an electrical coil;
providing a first permanent magnet having a first side with a strong magnetic flux and a second side with a weak magnetic flux in a tangential direction;
providing a second permanent magnet having a first side with the strong magnetic flux and a second side with the weak magnetic flux in the tangential direction;
determining which sides of the first and second permanent magnets have the strong magnetic flux and the weak magnetic flux in the tangential direction; and
disposing the first and second permanent magnets such that the first and second permanent magnets are disposed adjacent to one another in such a way that said first and second sides are directed towards one another.

15. An electric machine of a motor vehicle, comprising:
a stator having an electrical coil;
a rotor mounted so as to be rotatable about a machine axis and having a number of permanent magnets disposed in a radial direction, each of said permanent magnets having a C-shaped cross section perpendicularly with respect to the machine axis, said C-shaped cross section having a concave boundary curve and a convex boundary curve which are both arcs whose center point is disposed on an auxiliary straight line which is perpendicular with respect to a radial straight line on which free ends of said C-shaped cross section are disposed, wherein an arc forming said concave boundary curve has a larger radius than an arc forming said convex boundary curve.

16. An adjustment drive for a motor vehicle, the adjustment drive comprising:
an electric machine containing a stator having an electrical coil and a rotor mounted so as to be rotatable about a machine axis, said rotor having a number of permanent magnets disposed in a radial direction, each of said permanent magnets having a first side with a strong magnetic flux and a second side with a weak magnetic flux in a tangential direction, wherein when said permanent magnets are adjacent in the tangential direction, said first and second sides are directed towards one another, and said permanent magnets are magnetized in the tangential direction.

* * * * *